United States Patent
Milne

(10) Patent No.: US 6,301,585 B1
(45) Date of Patent: Oct. 9, 2001

(54) REDUNDANCY ELIMINATION IN THE PERSISTENCE OF OBJECT GRAPHS

(75) Inventor: Philip S. Milne, San Francisco, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/271,049

(22) Filed: Mar. 17, 1999

(51) Int. Cl.[7] .............................. G06F 17/00; G06F 9/44
(52) U.S. Cl. .................. 707/103; 707/101; 709/313; 709/315
(58) Field of Search ........................ 707/103, 1–10, 707/100–102, 200–206; 709/315, 313–314, 316

(56) References Cited

U.S. PATENT DOCUMENTS

| | | | |
|---|---|---|---|
| 5,715,447 | * | 2/1998 | Hayashi et al. ........................... 707/8 |
| 5,860,009 | * | 1/1999 | Uchihara et al. ......................... 717/6 |
| 5,917,422 | * | 6/1999 | Adamec et al. ................. 340/825.15 |
| 6,012,059 | * | 1/2000 | Neimat et al. ............................ 707/8 |

OTHER PUBLICATIONS

Noble et al., "Scalable visualisations with ownership trees", Technology of Object–Oriented Languages and Systems, 2000. 37th International Conferenc on, pp. 202–213, Nov. 2000.*

Hill et al., "Visualizing the structure of object–oriented systems", Visual Languages, 2000 Proceedings. IEEE International Symposium on, pp. 191–198, Sep. 2000.*

Nakajima, "An adaptive object storage system for mobile computers", Parallel and Distributed Systems, Workshops, Seventh International Conference on, 2000, pp. 335–342, Jul. 2000.*

Java™ Object Serialization Specification, Revision 1.4.1, Oct. 8, 1997.

Biliris et al., "Making C++ Objects Persistent: the Hidden Pointers," Software—Practice and Experience, vol. 23, No. 12, Dec. 1993, pp. 1285–1303.

International Search Report, Application No. PCT/US 00/07238, mailed Oct. 5, 2000.

* cited by examiner

Primary Examiner—Thomas Black
Assistant Examiner—David Jung
(74) Attorney, Agent, or Firm—Conley, Rose & Tayon, PC; B. Noël Kivlin

(57) ABSTRACT

A method and system for incrementally serializing an object graph to a persistent form. An object graph is a set of nested objects, each with one or more properties. An object graph in a first environment is serialized to a temporary serialized form. At substantially the same time, the temporary serialized form is read into a second environment and deserialized in the second environment. By deserializing instantiation statements taken from the temporary form, a copy of the object graph is created in the second environment, wherein the objects have default values. For each object, only statements in the temporary serialized form that would alter the second environment are maintained in a final serialized form. The properties of classes are accessed through public APIs to avoid reliance on private implementations of classes. Therefore, serialized forms will typically still be deserializable even when private implementations are different across different platforms or across the same platform over time. Incremental serialization also includes error recovery and mechanisms to handle several special cases.

28 Claims, 3 Drawing Sheets

REDUNDANCY ELIMINATION IN THE PERSISTENCE OF OBJECT GRAPHS

BACKGROUND OF THE INVENTION

1. Field of the Invention

This invention relates generally to computer software. More particularly, the invention relates to the persistent storage of object-oriented components.

2. Description of the Related Art

There are many benefits associated with modularity and object-oriented programming paradigms in software designs. One such benefit is the use of reusable components. JavaBeans™ is one example of an object-oriented, software component model. Reusable components such as JavaBeans™ can be used as building blocks in composing applications. For example, a builder tool could be used to connect together and customize a set of JavaBeans™ components to act as an application. In this example, JavaBeans™ could include GUI elements such as windows and buttons that can be nested inside one another in an object graph. Reusable components can also be used more like stand-alone applications. For example, a JavaBean™ which implements a spreadsheet could be embedded in a web page or in another suitable container.

In any reusable component system, it is important to provide storage of components in a persistent form. When the reusable components are implemented in an object-oriented language, persistent storage can be achieved through serialization: a process of transforming one or more objects from a run-time or transient form to a persistent form. In other words, serialization is a process of recording the state of an object graph in such a way that the object graph can be reconstituted at a later time. Serialization is applicable not only to reusable components, but to any objects.

One approach to serialization, the default object serialization provided by the Java™ Language, flattens a graph of objects into a byte stream by taking a "snapshot" of memory. The byte stream can then be stored in one or more persistent containers such as files. Subsequently, the byte stream can be reconstituted into live Java™ Language objects through the process of deserialization. This approach, however, has many drawbacks. The snapshot of the live object graph is linked to the internal implementation of classes rather than to the public APIs of classes. This approach also produces a large amount of data to store. Furthermore, the data produced by this approach is in a binary format which cannot be edited manually using a standard text editor.

Another approach is to serialize an object graph in a textual format which is readable and editable by hand. For example, this approach could be implemented as shown in the following high-level pseudo-code, wherein the serialization output text generated by write() is based on Java™ Language source code:

```
writeObject(Object node) {
  nodeName=<generate a symbol>
  write(nodeName+"=new "+node.class +"()\n");
  for each property p in node.class.properties do {
    write(nodeName+"."+p.name+"="+
      writeObject(p.value(node))+"\n");
  }
  return name;
}
```

The approaches described above store all values, even default values, for objects. When many values of a object are default values, as is often the case, then huge amounts space are effectively wasted.

Another approach to serialization is to save space in the serialized file by storing meta-data which specifies default values of classes. In systems such as Delphi and Visual Basic, however, this approach is implemented only for primitive values, and not for value types that comprise objects. Furthermore, this approach is error-prone in that it leaves default information in two places: in the serialized meta-data and in the constructor.

Therefore, it is desirable to provide an improved system and method for serializing an object graph.

SUMMARY OF THE INVENTION

The problems outlined above are in large part solved by various embodiments of a method and system for incrementally serializing an object graph to a persistent form. In one embodiment, incremental serialization provides a number of advantages over previous methods, including: robustness through version changes in the Java™ Virtual Machine and in class libraries, textual output that is editable by hand using a standard text editor, comprehensive use of defaults to minimize serialized file size, and performance which varies linearly with the size of the object graph. Serialization according to the present disclosure may be applicable to any objects which have constructors and properties.

An object graph is a set of nested objects. Each object has one or more properties, and each property has a value. Property values in one embodiment may be objects. In one embodiment, the objects are reusable components such as JavaBeans™. In one embodiment, serialization is implemented using the resources of the object-oriented Java™ Platform and the object-oriented Java™ Language.

In one embodiment, the object graph exists in a first environment. The object graph in the first environment is serialized to a temporary or intermediate serialized form, such as, for example, a memory location within the serializer. The temporary or intermediate serialized form comprises two types of statements: a first type of statement for instantiating a new object, and a second type of statement for assigning values to the properties of the object. At substantially the same time as the serialization, the temporary or intermediate serialized form is deserialized (or evaluated) in a second environment, outside the scope of the first environment. Typically, each object is instantiated in the second environment through deserialization of the instantiation statements. In one embodiment, instantiation takes place through the invocation of a constructor for the object's class. A constructor creates a new object and assigns default values to properties of the object in the second environment. In this way, a copy of each object is created in the second environment, wherein the properties of the new object have their default values.

After an object has been instantiated, the assignment statements for the object are examined. In one embodiment, the introspection function of JavaBeans™ is used to generate a list of properties of objects. Statement by statement, the potential assignment statements are examined with respect to the state of the second environment. Only assignment statements in the temporary or intermediate serialized form that would alter the second environment are maintained in the final serialized form. In one embodiment, the comparison takes place on the left-hand and right-hand sides of each assignment statement using the "equals" method defined on a Java™ Object. After comparing and possibly serializing the property assignment(s), deserialization of the object is completed by performing the assignments and/or other operations in the second environment. Redundant assignment statements are discarded and are not maintained in the final serialized form. In one embodiment, redundant instantiations are discarded in a similar way.

The properties of classes are accessed through public APIs to avoid reliance on private implementations of classes. Therefore, serialized forms will typically still be deserializable even when private implementations are different across different platforms or across the same platform over time. In one embodiment, incremental serialization includes error recovery and mechanisms to handle several special cases.

BRIEF DESCRIPTION OF THE DRAWINGS

Other objects and advantages of the invention will become apparent upon reading the following detailed description and upon reference to the accompanying drawings in which.

Figure 1:
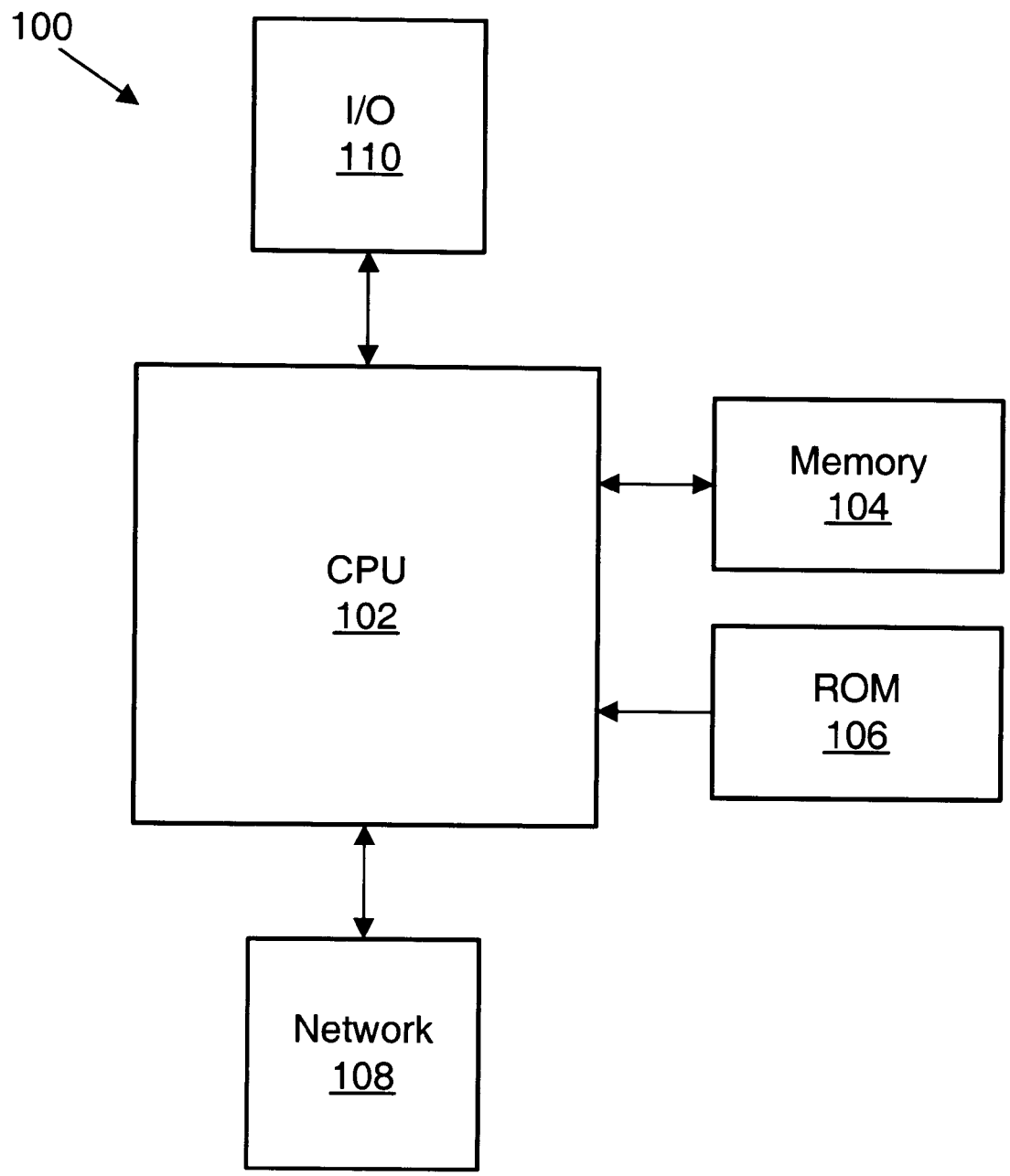
FIG. 1 is an illustration of a computer system which is suitable for implementing incremental serialization according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 is an illustration of a typical, general-purpose computer system 100 which is suitable for implementing incremental serialization as described herein. The computer system 100 includes at least one central processing unit (CPU) or processor 102. The CPU 102 is coupled to a memory 104 and a read-only memory (ROM) 106. The memory 104 is representative of various types of possible memory: for example, hard disk storage, floppy disk storage, removable disk storage, or random access memory (RAM). As shown in FIG. 1, typically the memory 104 permits two-way access: it is readable and writable. The ROM 106, on the other hand, is readable but not writable. The memory 104 and/or ROM 106 may store instructions and/or data which implement all or part of the serialization system and method described in detail below, and the memory 104 and/or ROM 106 may be utilized to install the instructions and/or data. In various embodiments, the computer system 100 may comprise a desktop computer, a laptop computer, a palmtop computer, a network computer, a personal digital assistant (PDA), an embedded device, a smart phone, or any other suitable computing device.

The CPU 102 may be coupled to a network 108. The network 108 is representative of various types of possible networks: for example, a local area network (LAN), wide area network (WAN), or the Internet. Incremental serialization as described herein may therefore be implemented on a plurality of heterogeneous or homogeneous networked computer systems 100 through one or more networks 108. The CPU 102 may acquire instructions and/or data for implementing serialization as described herein over the network 108.

Through an input/output bus 110, the CPU 102 may also be coupled to one or more input/output devices that may include, but are not limited to, video monitors or other displays, track balls, mice, keyboards, microphones, touch-sensitive displays, magnetic or paper tape readers, tablets, styluses, voice recognizers, handwriting recognizers, printers, plotters, scanners, and any other devices for input and/or output.

The CPU 102 may acquire instructions and/or data for implementing serialization as described herein through the input/output bus 110.

In implementing incremental serialization, the computer system 100 executes one or more computer programs. The computer programs are stored in a memory medium or storage medium such as the memory 104 and/or ROM 106, or they may be provided to the CPU 102 through the network 108 or I/O bus 110.

As will be described in further detail below, the computer system 100 implements a system and method for incrementally serializing an object graph into a compact, persistent form. As used herein, serialization is a process of transforming one or more objects from a run-time or transient form to a persistent form from which the objects can be reconstituted. As used herein, deserialization is a process of reconstituting or rebuilding the one or more objects from the persistent form to a run-time or transient form. An object graph, as used herein, is any set of one or more nested objects.

The Java™ Language, which in one embodiment is used to implement the incremental serialization described herein, supports a default object serialization method that is described above in the Description of the Related Art. Improved serialization according to one embodiment provides a number of advantages over previous methods, including the default Java™ method, including, but not limited to: robustness through version changes in the Java™ Virtual Machine and in class libraries, textual output that is editable by hand using a standard text editor, comprehensive use of defaults to minimize serialized file size, and performance which varies linearly with the size of the object graph. Incremental serialization as described herein may be applicable to any objects which have constructors and properties.

Figure 2:
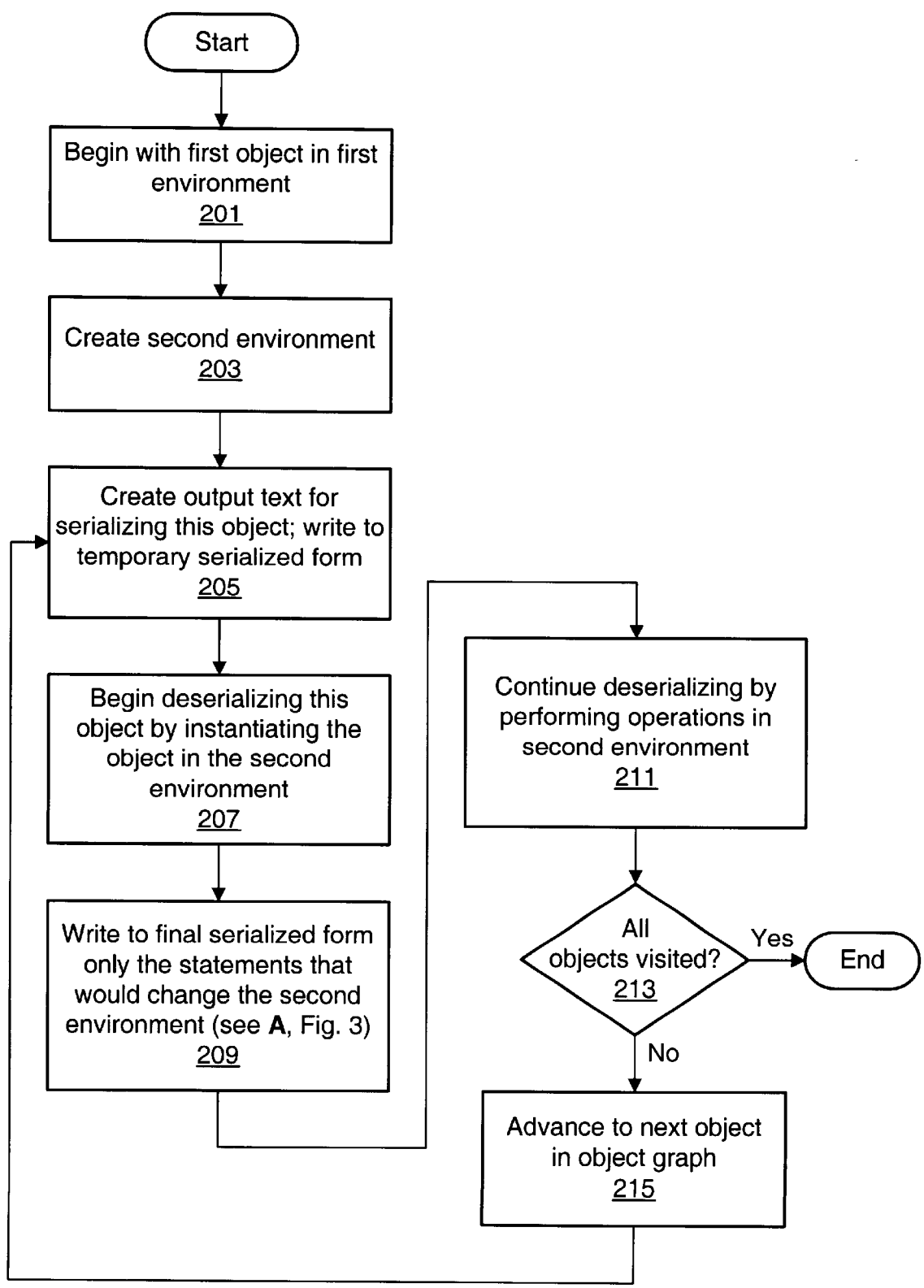
FIG. 2 is a flowchart illustrating one embodiment of incremental serialization.

FIG. 2 is a flowchart illustrating the serialization method according to one embodiment. In one embodiment, the serialization method proceeds object-by-object in the object graph. In step 201, therefore, the first object in a first environment is the starting object. In other words, the initial object of concern is the first object. In one embodiment, where the relationships between or among the objects are those of containership, the first object is typically the outermost container. For example, if the object graph to be serialized is a reusable component such as a window, then the first object might be the outermost container, the window object itself, rather than the objects contained in the window. The first environment is the environment or scope in which the first object resides.

In step 203, a second environment is created. The second environment in one embodiment is distinct from the first environment and is free from any changes that might have been made by a user to the object graph in the first environment. In other words, the second environment is outside the scope of the first environment. In one embodiment, the second environment is created in the first iteration of step 207 as discussed below. In one embodiment, the second environment is a hash table.

In step 205, serialization output text for serializing this object is created. In other words, text is created for describing this object and its properties in a persistent form so that the object can be reconstituted at a later time. In one embodiment, the serialization output text comprises two different types of statements: a first type of statement, an instantiation statement, for instantiating a new object; and a second type of statement, an assignment statement, for assigning values to the properties of an object. In the first iteration of step 205, the serialized object is the first object.

In one embodiment, the serialization output text created in step 205 is written to a temporary or intermediate serialized form. In various embodiments, a serialized form may comprise an output stream, a memory location internal to the serialization method, a file stored in a memory medium, or any other suitable form. In various embodiments, the text can be expressed in source code such as Jave™ Language source code, XML (Extensible Markup Language), or any other suitable format.

In step 207, part of the serialization output text that was generated in step 205 is deserialized in the second environment by creating a new object of this object's class. In one embodiment, the statement or statements which would result in the instantiation of a new object are deserialized in the second environment. In one embodiment, a constructor for the object's class is invoked and a new object is thus instantiated in the second environment. The properties of the new object have default values as assigned by the constructor. In other words, in step 207 this object is reconstituted with its default values in the second environment. In the first iteration of step 207, the first object is instantiated. In one embodiment, the second environment is created not in step 203, but rather in the first iteration of step 207 when the first object is instantiated.

Figure 3:
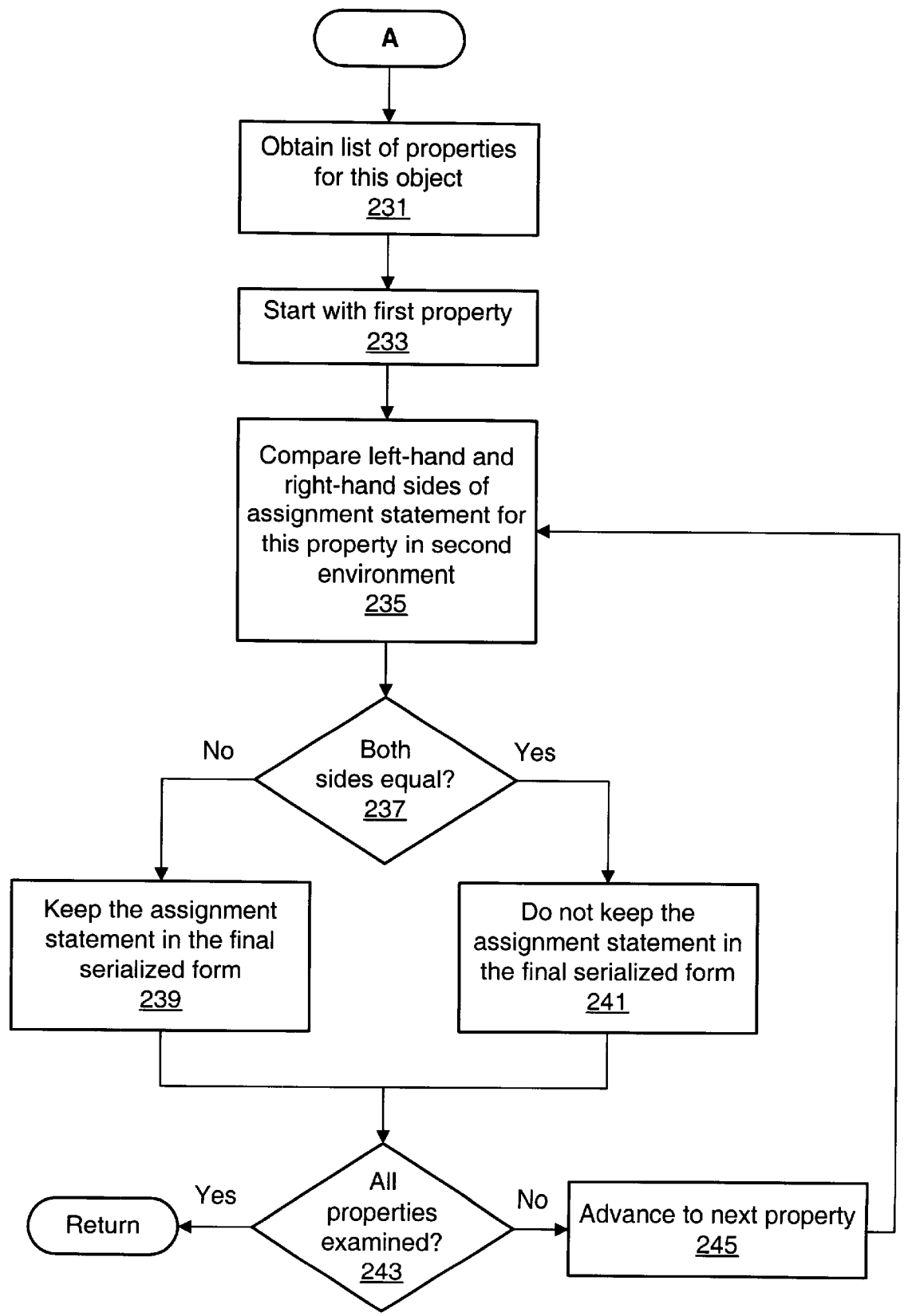
FIG. 3 is a flowchart further illustrating one embodiment of incremental serialization.

In step 209, the serialization output text for property assignments for this object is examined, and only those assignment statements that would change the second environment are kept. In other words, an assignment that would merely set a default value is typically not kept. In one embodiment, the left-hand and right-hand sides of assignment statements are compared, one assignment statement at a time, in the second environment. If the left-hand side and right-hand side of the assignment are not identical in the second environment, then the assignment statement is kept in a final serialized form. If the two sides are identical, on the other hand, then the assignment statement is not kept in the final serialized form. Step 209 serves to shrink the size of the serialized form, often by a large factor, by not maintaining in the final serialized form any property assignments that are redundant. FIG. 3, discussed below, further illustrates this step according to one embodiment.

In one embodiment, redundant instantiations are eliminated from the final serialized form in a way similar to the elimination of redundant assignment statements as discussed herein. In this embodiment, the first object is blindly instantiated, but successive objects are only instantiated in the second environment if the instantiation would alter the second environment. In one embodiment, instantiations are eliminated when an appropriate instance belonging to the same class already exists in the second environment. Instead of making a new copy of this instance, the original copy is used, and its properties are set using the same recursive algorithm. When no appropriate instance belonging to the same class exists, a new instance is instantiated in the second environment. Thus, only the instantiation statements that would generate an instance of a different class are maintained in the final serialized form.

In one embodiment, the final serialized form generated in step 209 is a new form which is different from the temporary or intermediate serialized form created in step 205. In this embodiment, non-redundant statements are written anew to the final serialized form, as illustrated in step 209. In another embodiment, the temporary or intermediate serialized form created in step 205 is the same form as the final serialized form referred to in step 209. In this embodiment, all the statements created in step 205 are written to the serialized form, and then redundant statements are deleted from the serialized form, as illustrated in step 209.

In step 211, deserialization is implemented by evaluating in the second environment the expressions as they appear in the final serialized form. In one embodiment, the expressions are instantiation and assignment statements.

In step 213, it is determined whether all the objects in the object graph have been visited. In one embodiment, hash tables are used to maintain a memory of which objects have been visited in the serialization method. If all the objects have been visited, then the method is ended. If all the objects have not been visited, then, in step 215, the next object in the object graph in the first environment is made the object of interest. In one embodiment, the object graph is traversed recursively. This next object is then serialized by returning to step 205.

FIG. 3 further illustrates the serialization of properties for a given object. FIG. 3 is an elaboration of step 209 of FIG. 2. Therefore, the method shown in FIG. 3 could replace step 209 and could be invoked instead of step 209. The method of FIG. 3 could be implemented by a subroutine, a function, or any other suitable programming construct.

In step 231 of FIG. 3, a list of properties for this object is obtained. In one embodiment, the object graph comprises a plurality of reusable components such as JavaBeans™, and the Beans Introspector is used to generate a list of properties for each class. The Beans Introspector is a JavaBeans™ resource for determining the properties, events, and methods supported by a JavaBean™. Properties of objects may have properties of their own, and so on. As used herein, "properties" refers to properties of objects, properties of other properties, and any other properties which may exist in the object graph.

In step 233, the first property is the property to be examined. In step 235, the assignment statement for this property is examined in the second environment. In one embodiment, the left-hand side and right-hand side of the assignment are compared, as discussed above with respect to step 209. Often, the property in the second environment will have a default value as assigned by the object's constructor. In step 237, it is determined whether the two sides of the assignment statement are equal. In other words, in step 237 it is determined whether the property assignment statement would change the second environment if the statement were deserialized. In one embodiment, the "equals" method defined on a Java™ Object is used to determine equality. In one embodiment, property values are objects. Use of the "equals" method permits equivalence testing of both primitive and complex (e.g., object) values.

If the two sides of the assignment are not equal, then in step 239 the relevant assignment statement (created in step 205, FIG. 2) is kept in the final serialized form. On the other hand, if the two sides are equal, then in step 241 the assignment statement for this property is not kept in the final serialized form.

In step 243, it is determined whether all the properties of this object have been examined. If so, then the flow of control returns to the location in the method of FIG. 2 from which the method of FIG. 3 was invoked. If not, then in step 245 the next property in the list of properties is made the property of interest, and then the method returns to step 235 so that additional properties and assignment statements can be examined.

By creating and altering objects through their public APIs (application programming interfaces) rather than relying on the implementation-dependent internal details of classes, serialization according to one embodiment attains a level of robustness and reliability across different implementations of the Java™ Virtual Machine and across changes in internal class implementation. As long as the public API(s) of a class remain the same, a serialized file will typically be deserializable regardless of any changes in the internal implementation of the class.

In one embodiment, it would be advantageous to satisfy the following relationship: after the property "p" of an instance "i" is set to a value "v" as follows (to use an exemplary syntax based on the Java™ Language):

i.p=v;

then the value of the property "p" in instance "i" is equal to the value "v" as follows (to use an exemplary syntax based on the Java™ Language):

v.equals(i.p)=true

A beneficial result of one embodiment of the serialization system and method described herein is that equivalence relations are preserved. In other words, objects are assigned the correct properties, and objects that were shared in the source environment end up being shared in the destination environment. For example, consider the following input source code (expressed in a pseudo-Java™ Language):

list1=new Jlist();
list2=new Jlist();
writeObject(new Object[]{list1, list2});

With serialization according to one embodiment, the input above will produce the following serialized output:

list1=new Jlist();
list2=new Jlist();
result=new Object[]{list1, list2};

Therefore, two lists with models that have exactly the same properties are correctly instantiated by their constructors ("new") to produce two different lists that contain two different models.

Yet consider a second example of input source code:

model=new DefaultListModel();
list1=new Jlist(model);
list2=new Jlist(model);
writeObject(new Object[]{list1, list2});

and its accompanying serialized output:

list1=new Jlisto;
list2=new Jlist();
list2.model=list1.model;
result new Object[]{list1, list2};

In this second example, the serialized file reflects that the two lists have the same model. Moreover, the algorithm has realized that since the first list already has a model of the right type, there is no point in throwing away the model inside the list, list1, only to replace it with another fresh instance of the same model. If there are any public properties, they can be set on the model which was created by the constructor. If there are not any public properties, as in this example, then the default model contained in the Jlist is indistinguishable from one that would be instantiated afresh.

To prevent serialized forms from "breaking" in a potential future deserialization, serialization according to one embodiment includes error handling as follows. During the writing phase, while setting the values in the second environment, any exceptions (i.e., errors) are caught. When an exception is encountered, the emission of the offending assignment to the serialized file is skipped. Therefore, the serialized form will not cause the same error when deserialized in an identically configured environment. Furthermore, the input stream should also catch errors encountered in the evaluation of statements. When an error is encountered in the reading process, the statement is discarded and evaluation continues with the next statement. If the statement that threw the error was an instantiation that was intended to bind a name to a value in the evaluating environment, then this variable is left unbound. Any subsequent reference to that variable will also throw an error and skip the statement that referenced it.

In one embodiment, serialization is implemented using the resources of the object-oriented Java™ Platform and the object-oriented Java™ Language. The Java™ Language is described in *The Java Language Specification* by Gosling, Joy, and Steele (Addison-Wesley, ISBN 0-201-63451-1), which is incorporated herein by reference. The Java™ Language is an object-oriented programming language. In an object-oriented programming language, data and related methods can be grouped together or encapsulated to form an entity known as an object. The object is the fundamental building block of object-oriented programming. The data structures within an object may alternately be referred to as the object's state, its attributes, its fields, or its variables. The procedures which operate on the variables are usually referred to in Java™ as the methods of the object.

The Java™ Platform which utilizes the object-oriented Java™ Language is a software platform for delivering and running the same applications or applets on a plurality of different operating systems and hardware platforms. The Java™ Platform sits on top of these other platforms, in a layer of software above the operating system and above the hardware. The Java™ Platform has two basic parts: the Java™ Virtual Machine, and the Java™ Application Programming Interface (Java™ API). The Java™ API may be thought of as comprising multiple application programming interfaces (APIs). The Java™ API or APIs specify a set of programming interfaces between Java™ applications and the Java™ Virtual Machine. While each underlying platform has its own implementation of the Java™ Virtual Machine, there is only one Virtual Machine specification. The Java™ Virtual Machine specification is described in *The Java Virtual Machine Specification* by Lindholm and Yellin (Addison-Wesley, ISBN 0-201-63452-X), which is incorporated herein by reference. By allowing Java™ applications and applets to execute on the Java™ Virtual Machine across many different underlying computing platforms, the Java™ Platform can provide a standard, uniform programming interface which allows Java™ applications and applets to run on any hardware on which the Java™ Platform has been implemented. The Java™ Platform is therefore designed to provide a "write once, run anywhere" capability.

Developers use the Java™ Language and Java™ APIs to write source code for Java™-powered applications and applets. A developer compiles the source code only once to the Java™ Platform, rather than to the machine language of an underlying system. Java™ programs compile to bytecodes which are machine instructions for the Java™ Virtual Machine. A program written in the Java™ Language compiles to a bytecode file which can run wherever the Java™ Platform is present, on any underlying operating system and on any hardware. In other words, the same Java™ application or applet can run on any computing platform that is running the Java™ Platform. Therefore, Java™ applications and applets are expressed in one form of machine language and are translated by software in the Java™ Platform to another form of machine language which is executable on a particular underlying computer system.

When serialization according to one embodiment is implemented in one embodiment in the Java™ Language, several special cases may arise. These exceptional situations may require adding additional steps to the algorithms discussed with reference to FIGS. 2 and 3. The solutions described below avoid changing the implementations of the classes and thus preserve the reliance on public APIs of the serialization system and method described herein.

The first special case may occur for classes that do not have nullary constructors (i.e, constructors which take zero arguments). Examples of such classes may include Color, Rectangle, Dimension, Integer, String, and other classes whose constructors require at least one argument. In this case, the serializer program obtains and stores meta-data which specifies the parameters of a constructor as named properties.

A second special case may occur for classes that have no public constructors: for example, Method, Class, and Array. In this case, synthetic constructors are used to create an instance of a class which does not have a public constructor.

A third special case may arise for classes that do not expose all of their useful state as standard properties: for example, Hashtable, Container, and Array. In this case, the serializer can use synthetic properties which expose public state as regular properties which sometimes have arrays as values.

A fourth special case may arise for objects that have side effects: in other words, for objects that change state outside the environment in which they are created. This situation is rare, and it may occur as in the following example from the abstract windowing toolkit of Java™:

INPUT:
window=new Window();
writeObject(window);
OUTPUT:
window=new Window();
window.name="window0";
result=window;

The side effect is that a static variable is incremented each time a new window is created. The serializer notices this assignment and sets the property so that it is identical to the original. In order to reduce the need to handle this special case, the properties of an object are listed and processed in the order of most side effects to least side effects. Thus, the majority of the state in the latter properties can be skipped to reduce file size.

One embodiment of the incremental serialization method is further illustrated with the Java™ Language method writeNode() which is shown as follows. The writeNode() method relies on an implementation of the addTerm() method which should take an (evaluatable) expression passed to it, evaluate the expression, and add it to a list of terms that will represent the output. The evaluation will either create a new object and assign it a name (a defineRepresentation) or will assign to a property a previously defined expression (a setRepresentation). The instance which will have its property set may either be an instance, previously defined by a defineRepresentation, or will be a getRepresentation of such terms. This allows statements of the following types to be generated at the output: instantiation, e.g., button0=new Button(string0);
direct property assignment, e.g.,
button0.background=color0;
and general property assignment, e.g.,
button0.model.state=button1.model.state;

To evaluate these expressions, an evaluator must be able to: instantiate, set a property, and get a property. In one embodiment, the writeNode() method shown as follows is initially called with the object to be serialized as the first argument and null as the second argument:

```
private Object writeNode(Object node, Object exp) throws
    IOException
{
    // Check a hashtable to see if the node is new.
    if (valueToExpression(node) !=null) {
        return valueToExpression(node);
    }
    // Terminate the recursion on recognizing certain primi-
        tive types.
    if (isPrimitive(node)) {
        return primitiveRepresentation(node);
    }
    // Instantiate this node, using constructor parlance.
    Class type=node.getClass();
    Object reference=environment.evaluate(exp);
    try {
        if (reference=null ||type !=reference.getClass() {
            Object[]args=getConstructorArguments(node);
            exp=instanceName(node);
            reference=addTerm(defineRepresentation(exp, type,
                args));
        }
        valueToExpression.put(node, exp);
    }
    catch (Throwable e) {
        System.err.println("Warning: Failed to make instance
            of "+type+".");
        return exp;  // Note: evaluating exp will give an
            unbound variable exception.
    }
    // Now write out the properties of this instance.
    Enumeration properties=getProperties(type);
    while(properties.hasMoreElements()) {
        Property property=(Property)properties.nextElement();
        String propertyName=property.getName();
        try {
            Object propertyValue=property.get(node);
            Object lValue=property.get(reference);
            Object lName=getRepresentation(exp,
                propertyName);
            Object rName=writeNode(propertyValue, lName);
            Object rValue=environment.evaluate(rName);
            if (!equals(lValue, rValue)) {
                property.set(reference, rValue);
                addTerm(setRepresentation(lName, rName));
```

```
      }
    }
    catch (Throwable e) {
      System.err.println("Warning: Failed to assign"+
          propertyName +"property of "+exp+".");
    }
  }
}
return exp;
}
```

Various embodiments further include receiving or storing instructions and/or data implemented in accordance with the foregoing description upon a carrier medium. Suitable carrier mediums include storage mediums such as disk, as well as electrical signals or digital signals conveyed via a communication medium such as network 108 or a wireless link.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A method for serializing an object graph into a persistent form, wherein the object graph comprises one or more objects, wherein each object has one or more properties, wherein each property has an associated value, the method comprising:

serializing the object graph to a temporary serialized form, wherein the temporary serialized form comprises instantiation statements and assignment statements;

deserializing the instantiation statements of the temporary serialized form to create a copy of the object graph, wherein properties in the copy of the object graph are assigned default values;

examining each statement in the temporary serialized form to determine whether each statement is redundant;

writing to a final serialized form each statement that is not redundant.

2. The method of claim 1, wherein the objects are reusable components.

3. The method of claim 2, wherein the reusable components are JavaBeans.

4. The method of claim 1, wherein examining each statement in the temporary serialized form to determine whether each statement is redundant further comprises examining each assignment statement in the temporary serialized form to determine whether each assignment statement would alter the copy of the object graph;

wherein writing to the final serialized form each statement that is not redundant further comprises writing to the final serialized form each assignment statement that would alter the copy of the object graph.

5. The method of claim 4, wherein examining each assignment statement in the temporary serialized form to determine whether each assignment statement would alter the copy of the object graph further comprises comparing a left-hand side to a right-hand side of each assignment statement.

6. The method of claim 1, wherein examining each statement in the temporary serialized form to determine whether each statement is redundant further comprises examining each instantiation statement in the temporary serialized form to determine whether each instantiation statement would generate an instance of a different class;

wherein writing to the final serialized form each statement that is not redundant further comprises writing to the final serialized form each instantiation statement that would generate an instance of a different class.

7. The method of claim 1, wherein deserializing the instantiation statements of the temporary serialized form further comprises invoking a constructor for a class associated with each of the objects in the temporary serialized form;

wherein invoking the constructor further comprises instantiating a new object of the class and assigning default values to the properties of the new object.

8. The method of claim 1, further comprising:

deserializing the statements of the final serialized form upon the copy of the object graph.

9. The method of claim 1, wherein one or more of the values of the properties is an object.

10. A carrier medium comprising program instructions for serializing an object graph into a persistent form, wherein the object graph comprises one or more objects, wherein each object has one or more properties, wherein each property has an associated value, wherein the program instructions are executable to implement:

serializing the object graph to a temporary serialized form, wherein the temporary serialized form comprises instantiation statements and assignment statements;

deserializing the instantiation statements of the temporary serialized form to create a copy of the object graph, wherein properties in the copy of the object graph are assigned default values;

examining each statement in the temporary serialized form to determine whether each statement is redundant; and writing to a final serialized form each statement that is not redundant.

11. The carrier medium of claim 10, wherein examining each statement in the temporary serialized form to determine whether each statement is redundant further comprises examining each assignment statement in the temporary serialized form to determine whether each assignment statement would alter the copy of the object graph;

wherein writing to the final serialized form each statement that is not redundant further comprises writing to the final serialized form each assignment statement that would alter the copy of the object graph.

12. The carrier medium of claim 11, wherein examining each assignment statement in the temporary serialized form to determine whether each assignment statement would alter the copy of the object graph further comprises comparing a left-hand side to a right-hand side of each assignment statement.

13. The carrier medium of claim 10, wherein examining each statement in the temporary serialized form to determine whether each statement is redundant further comprises examining each instantiation statement in the temporary serialized form to determine whether each instantiation statement would generate an instance of a different class;

wherein writing to the final serialized form each statement that is not redundant further comprises writing to the final serialized form each instantiation statement that would generate an instance of a different class.

14. The carrier medium of claim 10, wherein deserializing the instantiation statements of the temporary serialized form further comprises invoking a constructor for a class associated with each of the objects in the temporary serialized form;

wherein invoking the constructor further comprises instantiating a new object of the class and assigning default values to the properties of the new object.

15. The carrier medium of claim 10, wherein the program instructions are further executable to implement:

deserializing the statements of the final serialized form upon the copy of the object graph.

16. The carrier medium of claim 10, wherein one or more of the values of the properties is an object.

17. The carrier medium of claim 10, wherein the objects are reusable components.

18. The carrier medium of claim 17, wherein the reusable components are JavaBeans.

19. The carrier medium of claim 10, wherein the carrier medium is a storage medium.

20. A computer system for serializing an object graph into a persistent form, wherein the object graph comprises one or more objects, wherein each object has one or more properties, wherein each property has an associated value, the computer system comprising:

a CPU;

a system memory coupled to the CPU;

a persistent memory coupled to the CPU;

wherein the system memory stores program instructions executable by the CPU, wherein the program instructions are executable to:

serialize the object graph to a temporary serialized form, wherein the temporary serialized form comprises instantiation statements and assignment statements;

deserialize the instantiation statements of the temporary serialized form to create a copy of the object graph, wherein properties in the copy of the object graph are assigned default values;

examine each statement in the temporary serialized form to determine whether each statement is redundant;

write to a final serialized form each statement that is not redundant.

21. The computer system of claim 20, wherein in examining each statement in the temporary serialized form to determine whether each statement is redundant, the program instructions are further executable to examine each assignment statement in the temporary serialized form to determine whether each assignment statement would alter the copy of the object graph;

wherein in writing to the final serialized form each statement that is not redundant, the program instructions are further executable to write to the final serialized form each assignment statement that would alter the copy of the object graph.

22. The computer system of claim 21, wherein in examining each assignment statement in the temporary serialized form to determine whether each assignment statement would alter the copy of the object graph, the program instructions are further executable to compare a left-hand side to a right-hand side of each assignment statement.

23. The computer system of claim 20, wherein in examining each statement in the temporary serialized form to determine whether each statement is redundant, the program instructions are further executable to examine each instantiation statement in the temporary serialized form to determine whether each instantiation statement would generate an instance of a different class;

wherein in writing to the final serialized form each statement that is not redundant, the program instructions are further executable to write to the final serialized form each instantiation statement that would generate an instance of a different class.

24. The computer system of claim 20, wherein in deserializing the instantiation statements of the temporary serialized form, the program instructions are further executable to invoke a constructor for a class associated with each of the objects in the temporary serialized form;

wherein in invoking the constructor, the program instructions are further executable to instantiate a new object of the class and assign default values to the properties of the new object.

25. The computer system of claim 20, wherein the program instructions are further executable to:

deserialize the statements of the final serialized form upon the copy of the object graph.

26. The computer system of claim 20, wherein one or more of the values of the properties is an object.

27. The computer system of claim 20, wherein the objects are reusable components.

28. The computer system of claim 27, wherein the reusable components are JavaBeans.

* * * * *

UNITED STATES PATENT AND TRADEMARK OFFICE
CERTIFICATE OF CORRECTION

PATENT NO. : 6,301,585 B1
DATED : October 9, 2001
INVENTOR(S) : Philip S. Milne

It is certified that error appears in the above-identified patent and that said Letters Patent is hereby corrected as shown below:

Column 12,
Line 23, please insert -- computer-readable -- before "carrier".

Signed and Sealed this

Sixteenth Day of July, 2002

*Attest:*

*Attesting Officer*

JAMES E. ROGAN
*Director of the United States Patent and Trademark Office*